(12) United States Patent
Valdez

(10) Patent No.: US 7,334,308 B1
(45) Date of Patent: Feb. 26, 2008

(54) METHOD OF SECURING A BODY MOUNT SUPPORT BRACKET ON A VEHICLE BODY AND FRAME ASSEMBLY

(75) Inventor: Juan F. Valdez, Reading, PA (US)

(73) Assignee: Dana Corporation, Toledo, OH (US)

( * ) Notice: Subject to any disclaimer, the term of this patent is extended or adjusted under 35 U.S.C. 154(b) by 444 days.

(21) Appl. No.: 10/728,713

(22) Filed: Dec. 5, 2003

Related U.S. Application Data

(60) Provisional application No. 60/432,142, filed on Dec. 10, 2002.

(51) Int. Cl.
*B23P 11/02* (2006.01)
(52) U.S. Cl. .................................................. 29/446
(58) Field of Classification Search .................. 29/446, 29/448, 452, 428; 296/35.1
See application file for complete search history.

(56) References Cited

U.S. PATENT DOCUMENTS 1,867,806 A    7/1932  Brownell
5,618,453 A *  4/1997  La Rocca ............... 219/121.63
5,946,980 A *  9/1999  Raza et al. ................ 74/579 R

* cited by examiner

*Primary Examiner*—John C. Hong
(74) *Attorney, Agent, or Firm*—MacMillan, Sobanski & Todd, LLC

(57) ABSTRACT

A body mount support bracket, including a central body portion having a pair of leg portions depending therefrom, is secured to a frame portion of a vehicle body and frame assembly by flexing the leg portions from a first, unstressed position to a second, stressed position so as to create internal stresses within the body mount support bracket. Then, the central body portion and the leg portions of the body mount support bracket are secured to the frame portion, such as by welding, adhesives, and the like. The flexing of the leg portions is performed to create internal stresses within the body mount support bracket that remain after the body mount support bracket has been secured to the frame assembly. These residual internal stresses are effective to increase the strength and rigidity of the body mount support bracket beyond what would normally be obtained if the body mount support bracket was secured to the frame assembly side rail in an unstressed condition.

13 Claims, 3 Drawing Sheets

METHOD OF SECURING A BODY MOUNT SUPPORT BRACKET ON A VEHICLE BODY AND FRAME ASSEMBLY

CROSS REFERENCE TO RELATED APPLICATION

This application claims the benefit of U.S. Provisional Application No. 60/432,142, filed Dec. 10, 2002, the disclosure of which is incorporated herein by reference.

BACKGROUND OF THE INVENTION

This invention relates in general to body and frame assemblies for vehicles. In particular, this invention relates to an improved method for securing a body mount support bracket to a frame portion of a vehicle body and frame assembly so as to provide increased strength.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

In a typical separate type of vehicle body and frame assembly, the frame portion has a plurality of body mount support brackets secured thereto. The body mount support brackets are provided to facilitate the connection of the body portion of the vehicular body and frame assembly to the frame portion. Typically, each of the body mount support brackets has a generally inverted U-shaped configuration, including a central body portion having a pair of leg portions depending therefrom. An opening is formed through the central body portion of each of the body mount support brackets to facilitate the connection of the body portion of the vehicle body and frame assembly to the frame portion.

Traditionally, each of the body mount support brackets has been secured to a structural component of the frame portion of the vehicular body and frame assembly by initially disposing the central body portion and the leg portions thereof in abutment with the structural component, then securing such central body portion and leg portions to the structural component, such as by welding, adhesives, and the like. Although this method has been effective, it has been found that the capacity of the body mount support bracket to support a load thereon is limited by the overall strength and rigidity of the body mount support bracket. It would be desirable to provide an improved method for securing a body mount support bracket to a frame portion of a vehicle body and frame assembly so as to provide increased strength and rigidity.

SUMMARY OF THE INVENTION

This invention relates to an improved method for securing a body mount support bracket to a frame portion of a vehicle body and frame assembly so as to provide increased strength and rigidity. The body mount support bracket can include a central body portion having a pair of leg portions depending therefrom. The leg portions of the body mount support bracket are initially oriented in a first, unstressed position relative to the central body portion and to each other. To secure the body mount support bracket to the frame portion, the central body portion and the leg portions are positioned in abutment therewith. Then, the leg portions are flexed from the first, unstressed position to a second, stressed position so as to create internal stresses. Thereafter, the central body portion and the leg portions of the body mount support bracket are secured to the frame portion in any conventional manner, such as by welding, adhesives, and the like. The flexing of the leg portions is performed to create internal stresses within the body mount support bracket that remain after the body mount support bracket has been secured to the frame assembly. These residual internal stresses are effective to increase the strength and rigidity of the body mount support bracket beyond what would normally be obtained if the body mount support bracket was secured to the frame assembly side rail in an unstressed condition. Thus, the size and weight of the body mount support bracket can be slightly reduced.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
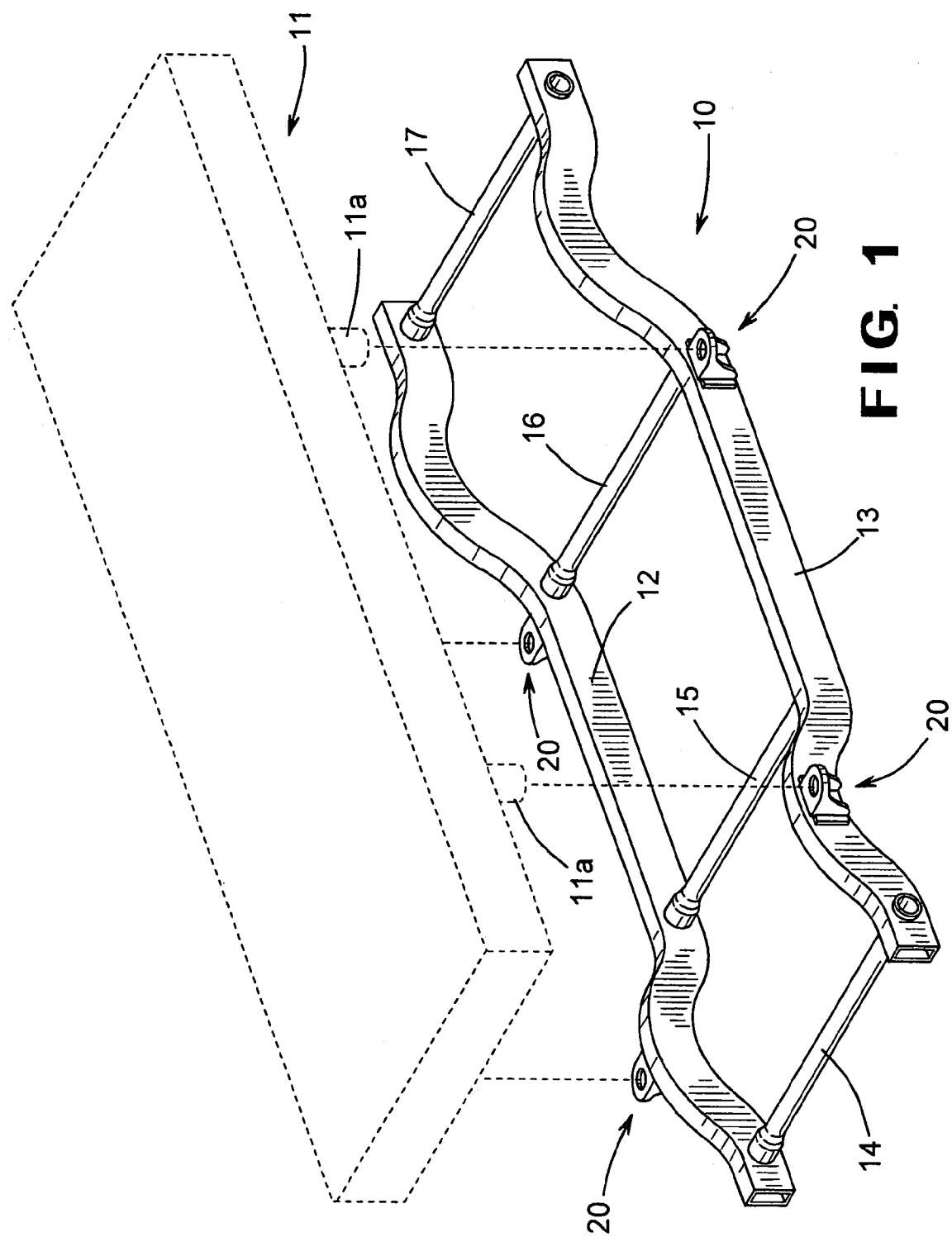
FIG. 1 is a perspective view of a vehicular body and frame assembly including a frame portion having a plurality of body mount support brackets secured thereto in accordance with the method of this invention.

Referring now to the drawings, there is illustrated in FIG. 1 a portion of a vehicular body and frame assembly that has been manufactured in accordance with this invention. The illustrated vehicular body and frame assembly is, in large measure, conventional in the art and is intended merely to illustrate one environment in which this invention may be used. Thus, the scope of this invention is not intended to be limited for use with the specific structure for the vehicular body and frame assembly illustrated in FIG. 1 or with vehicular body and frame assemblies in general. On the contrary, as will become apparent below, this invention may be used in any desired environment for the purposes described below.

The illustrated vehicular body and frame assembly is a separate type of body and frame assembly, including a frame portion, indicated generally at 10, and a body portion, indicated generally at 11. The illustrated frame portion 10 of the vehicular body and frame assembly is a ladder type frame portion, including a pair of longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a pair of closed channel structural members, each having an upper wall, a lower wall, and a pair of side walls. However, it is known that one or both of the side rails 12 and 13 may be formed from two or more pieces of material, such as a pair of C-shaped open channel structural members that are secured together, such as by welding, to form a closed channel structural member. Also, one or both of the side rails 12 and 13 may be formed from a plurality of individually formed closed channel structural members that are secured together by any conventional means, such as by welding, riveting, bolting, and the like. Furthermore, it is known that portions of the side rails 12 and 13 may be formed from open channel structural members.

The cross members 14 through 17 extend generally perpendicular to the side rails 12 and 13 and may be formed having any conventional structure. The cross members 14 through 17 are spaced apart from one another along the length of the frame portion 13 and can be secured to the side rails 12 and 13 by any conventional means, such as by welding, riveting, bolting, and the like. When secured to the side rails 12 and 13, the cross members 14 through 17 provide lateral and torsional rigidity to the frame portion 10 of the vehicular body and frame assembly.

A plurality of body mount support brackets, indicated generally at 20, are provided on the frame portion 10 of the vehicle body and frame assembly. The illustrated body mount support brackets 20 are stamped members that are secured to the side rails 12 and 13 of the vehicular body and frame assembly 10 in the manner described in detail below by any conventional means, such as by welding, adhesives, and the like. However, the body mount support brackets 20 can be formed in any desired manner and have any desired shape or configuration. The body mount support brackets 20 are provided to facilitate the connection of the body portion 11 and other various components (not shown) of the vehicle to the frame assembly 10.

Figure 2:
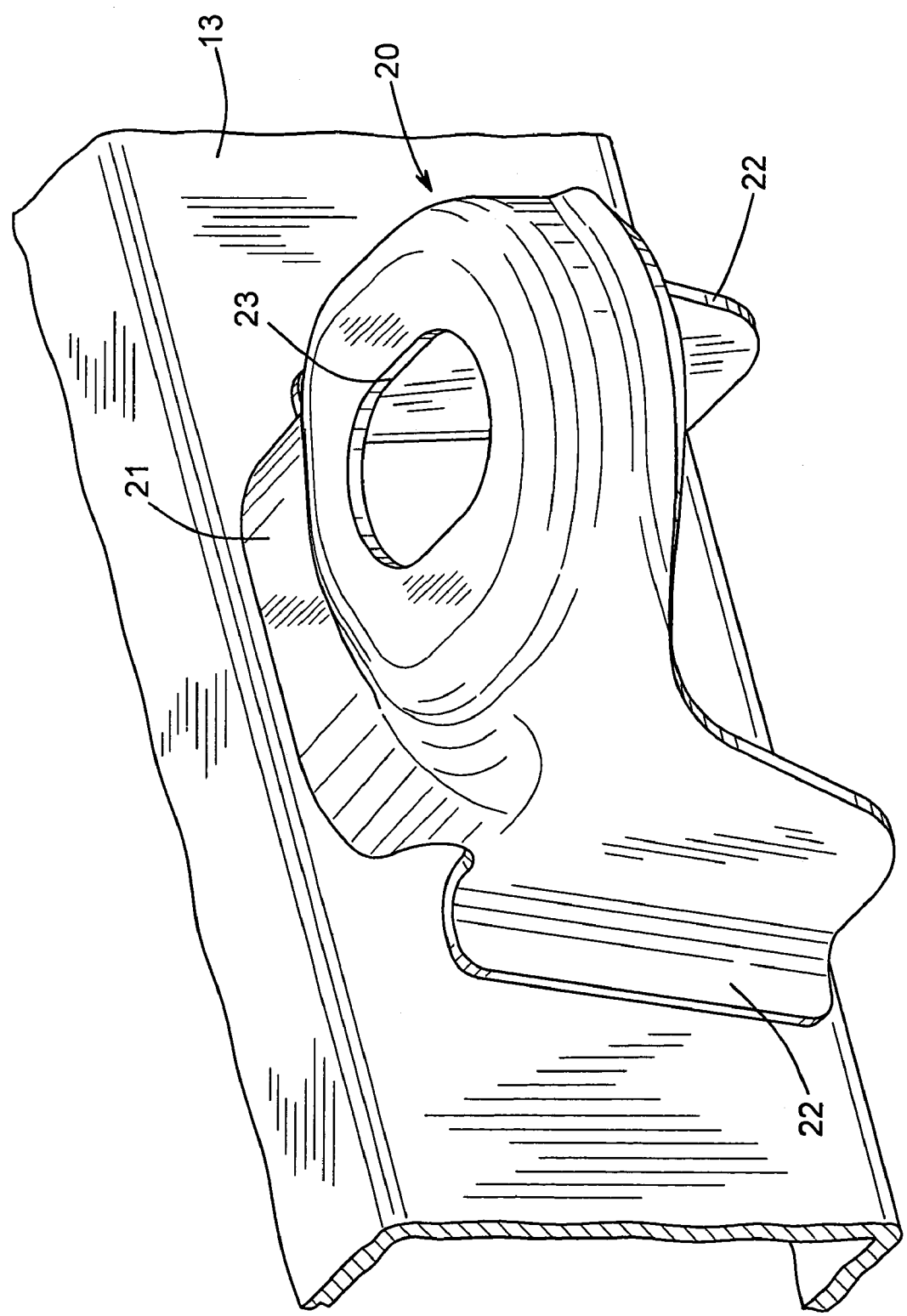
FIG. 2 is an enlarged perspective view of a portion of the frame assembly and one of the body mount support brackets illustrated in FIG. 1.

The structure of one of the body mount support brackets 20 is illustrated more clearly in FIG. 2. As shown therein, the illustrated body mount support bracket 20 includes a central body portion 21 having a pair of leg portions 22 depending therefrom. Thus, the illustrated body mount support bracket 20 has a generally inverted-U shaped configuration. An opening 23 is formed through the central body portion 21 of each of the body mount support brackets 20. The openings 23 are sized in accordance with respective body mounts 11a provided on the body portion 11 of the vehicular body and frame assembly 10. In a manner that is well known in the art, the body mounts 11a are received and supported within the openings 23 of the body mount support brackets 23 to connect the body portion 11 to the frame portion 10.

Figures 3, 4:
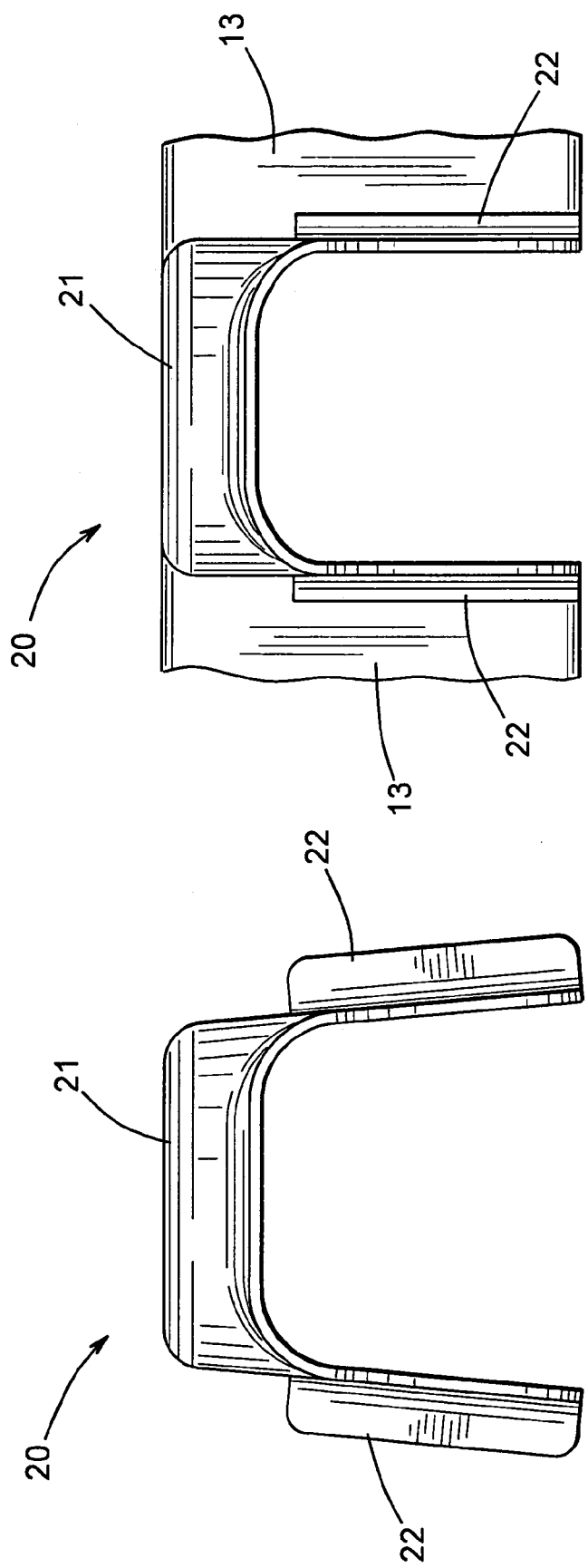
FIG. 3 is a side elevational view of the body mount support bracket illustrated in FIG. 2 shown in a first, unstressed condition before being secured to the frame portion of the vehicular body and frame assembly.
FIG. 4 is a side elevational view similar to FIG. 3 showing the body mount support bracket in a second, stressed condition after being secured to the frame portion of the vehicular body and frame assembly.

FIG. 3 shows the body mount support bracket 20 illustrated in FIG. 2 in a first, unstressed condition before being secured to the side rail 13 of the frame portion 10 of the vehicular body and frame assembly. As shown therein, the leg portions 22 of the body mount support bracket 20 are initially oriented in a first, unstressed position relative to the central body portion 21 and to each other. In the illustrated embodiment, the leg portions 22 of the illustrated body mount support bracket 20 extend downwardly from the central body portion 21, diverging slightly outwardly apart from one another. However, the leg portions 22 of the body mount support bracket 20 can be initially oriented in any desired first, unstressed position relative to the central body portion 21 and to each other. For example, the body mount support bracket 20 may be formed such that in the first, unstressed position, the leg portions 22 thereof extend downwardly from the central body portion 21 generally parallel to one another. Alternatively, the body mount support bracket 20 may be formed such that in the first, unstressed position, the leg portions 22 thereof extend downwardly from the central body portion 21 and converge slightly inwardly toward another.

To secure the body mount support bracket 20 on the side rail 13, the central body portion 21 and the leg portions 22 are initially positioned in abutment with the side rail 13. Then, the leg portions 22 are flexed from the first, unstressed position illustrated in FIG. 3 to a second, stressed position, such as shown in FIG. 4. In the illustrated embodiment, the leg portions 22 of the body mount support bracket 20 are flexed inwardly toward one another such that they extend downwardly from the central body portion 21 generally parallel to one another. However, the leg portions 22 of the body mount support bracket 20 can be flexed to any desired second, stressed position relative to the central body portion 21 and to each other. For example, the leg portions 22 of the body mount support bracket 20 may be flexed to extend downwardly from the central body portion 21 and converge slightly inwardly toward another. Alternatively, the leg portions 22 of the body mount support bracket 20 may be flexed to extend downwardly from the central body portion 21 and diverge further outwardly from another. Thereafter, while retained in the second, stressed position, the central body portion 21 and the leg portions 22 of the body mount support bracket 20 are secured to the side rail 13 in any conventional manner, such as by welding, adhesives, and the like.

The flexing and securement of the leg portions 22 in this manner is performed to create internal stresses within the body mount support bracket 20 that remain after the body mount support bracket 20 has been secured to the side rail 13. These residual internal stresses are effective to increase the strength and rigidity of the body mount support bracket 20 beyond what would normally be obtained if the body mount support bracket 20 was secured to the side rail 13 in an unstressed condition. Thus, the size and weight of the body mount support bracket 20 can be slightly reduced. The internal stresses can be created within the body mount support bracket 20 in the manner disclosed or in any other desired manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for securing a body mount support bracket to a portion of a vehicle body and frame assembly comprising the steps of:
   (a) providing a body mount support bracket including a central body portion having a pair of leg portions depending therefrom;
   (b) creating internal stresses within the body mount support bracket by moving the leg portions of the body mount support bracket relative to the central body portion of the body mount support bracket to create the internal stresses within the body mount support bracket; and
   (c) securing the body mount support bracket to a portion of a vehicle body and frame assembly so as to maintain the internal stresses therein.

2. The method defined in claim 1 wherein said step (a) is performed by providing the central body portion with an aperture therethrough.

3. The method defined in claim 2 wherein said step (a) is performed by providing leg portions that extend from the central body portion and diverge apart from one another.

4. The method defined in claim 3 wherein said step (b) is performed by moving the leg portions of the body mount support bracket inwardly toward one another.

5. The method defined in claim 3 wherein said step (b) is performed by moving the leg portions of the body mount support bracket outwardly apart from one another.

6. The method defined in claim 2 wherein said step (a) is performed by providing leg portions that extend from the central body portion generally parallel to one another.

7. The method defined in claim 6 wherein said step (b) is performed by moving the leg portions of the body mount support bracket inwardly toward one another.

8. The method defined in claim 6 wherein said step (b) is performed by moving the leg portions of the body mount support bracket outwardly apart from one another.

9. The method defined in claim 1 wherein said step (c) is performed by securing the body mount support bracket to a portion of a vehicle body and frame assembly by one of welding and adhesives.

10. The method defined in claim 2 wherein said step (a) is performed by providing leg portions that extend from the central body portion and converge toward one another.

11. The method defined in claim 10 wherein said step (b) is performed by moving the leg portions of the body mount support bracket inwardly toward one another.

12. The method defined in claim 10 wherein said step (b) is performed by moving the leg portions of the body mount support bracket outwardly apart from one another.

13. A method of manufacturing a vehicle body and frame assembly comprising the steps of:
   (a) providing a frame portion;
   (b) securing a body mount support bracket to a portion of the frame portion by providing a body mount support bracket including a central body portion having a pair of leg portions depending therefrom; creating internal stresses within the body mount support bracket by moving the leg portions of the body mount support bracket relative to the central body portion of the body mount support bracket to create the internal stresses within the body mount support bracket; and securing the body mount support bracket to a portion of a vehicle body and frame assembly so as to maintain the internal stresses therein;
   (c) providing a body portion having a body mount; and
   (d) supporting the body mount of the body portion on the body mount support bracket of the frame portion to provide a vehicle body and frame assembly.

* * * * *